Jan. 17, 1928. 1,656,778
E. J. DESROZIERS
FRICTION MEMBER FOR BRAKES, CLUTCHES, AND THE LIKE
Filed Jan. 29, 1926  2 Sheets-Sheet 1
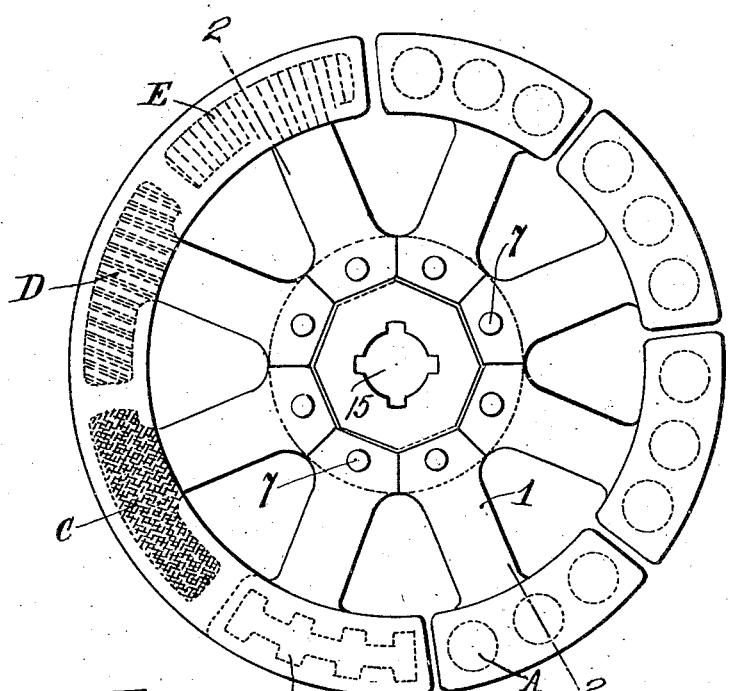
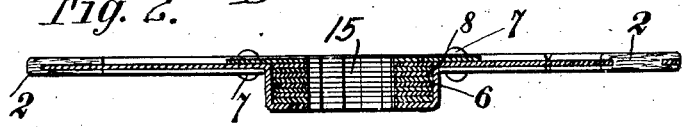
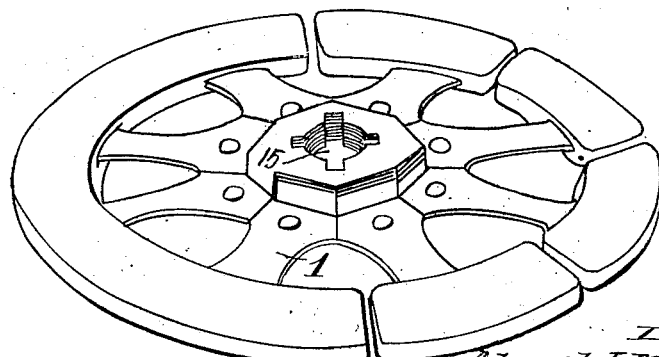
Inventor
Edouard J. Desroziers
By
James L. Norris
Attorney Jan. 17, 1928.  
E. J. DESROZIERS  
1,656,778  
FRICTION MEMBER FOR BRAKES, CLUTCHES, AND THE LIKE  
Filed Jan. 29, 1926  2 Sheets-Sheet 2
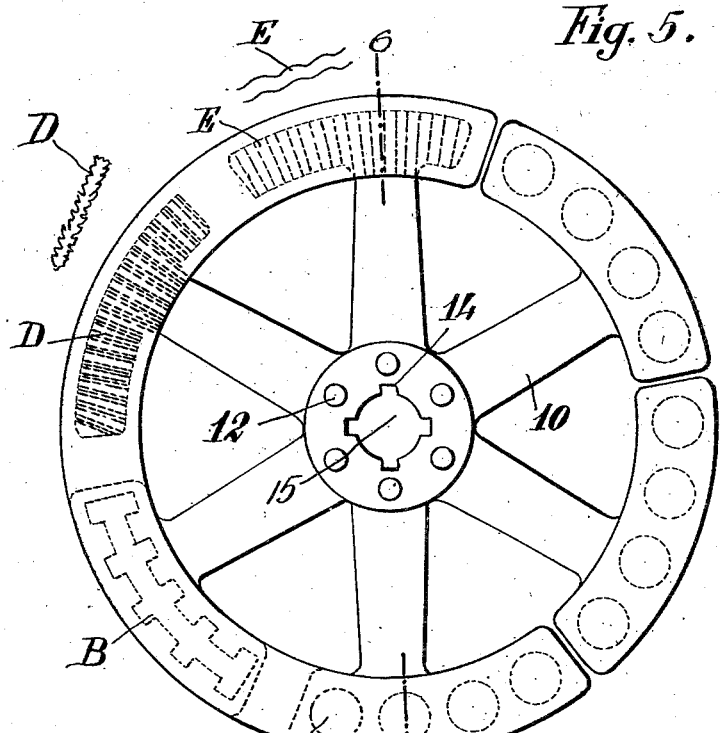
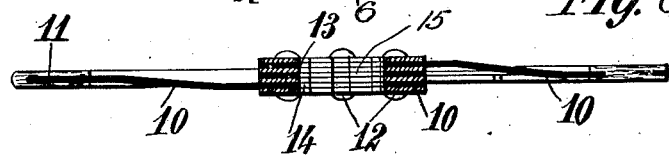
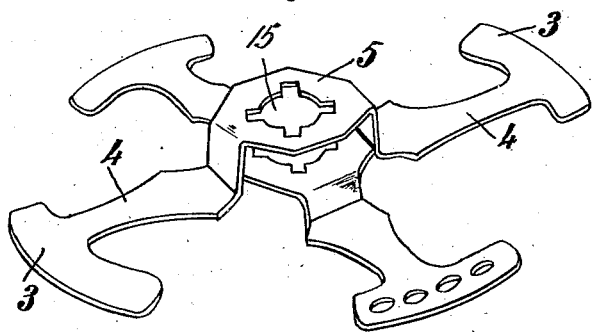
Inventor  
Edouard J. Desroziers  
By James L. Norris  
Attorney Patented Jan. 17, 1928.

1,656,778

UNITED STATES PATENT OFFICE.

EDOUARD JEAN DESROZIERS, OF PARIS, FRANCE.

FRICTION MEMBER FOR BRAKES, CLUTCHES, AND THE LIKE.

Application filed January 29, 1926, Serial No. 84,628, and in France December 31, 1925.

The present invention relates to improvements in the lining of all metallic friction members, brakes, clutches and all similar apparatus; it consists in effecting the casting in situ under pressure and the baking, upon specially prepared metallic members, of materials which are poor heat conductors and have a high coefficient of friction (derived from asbestos, wood, or any other product and chemically treated for this use).

The metallic members are specially prepared so that the friction material, under the action of the pressure to which it is subjected, thoroughly permeates all openings made in the metal, unites completely with the metal and thus affords a sufficient resistance to the wrenching action to which the friction linings are subjected.

The metallic members are so prepared by drilling, stamping, or the like, and are so designed that the rises in temperature produced:

1° by the baking at the time of manufacture, and,

2° by friction, at the time of operation of the apparatus on which they are installed, shall not harm the adhesion of the said linings.

For the same reason, the cast linings are of such dimensions that differences of expansion shall have no effect.

The present invention gives the following advantages:

1° Avoidance of the use of rivets for securing the friction material on the friction faces.

2° Reduction in the amount of friction lining required, since:

1. The lining need not be of the thickness which is indispensable for good riveting.

2. Reduction in general dimensions, since the whole surface is subjected to friction (there being no rivet holes).

3° Utilization of the material of only one disc of friction lining (instead of two) for the clutch discs, since the two faces of such disc take the friction.

4° Decrease in the weight and overall dimensions (principally in the case of multiple disc clutches).

5° Decrease in the inertia when the driven lined discs are moved out of engagement with the driving member.

6° Avoidance of the friction of the fixing rivets usually employed when wear in the linings occurs, thus avoiding rubbing contact of metal on metal, and hence avoiding rise in temperature and possibility of seizure.

7° Above all, saving in the weight of metal used in the manufacture of the metallic members and less waste of metal when cutting out the metallic members from the stock.

The invention is represented diagrammatically and by way of example in the annexed drawings, in which Fig. 1 represents a clutch-disc formed by a pile of arms cut out and pressed.

Fig. 2 is a section on the line 2—2, Fig. 1.

Fig. 3 is a perspective view of the disc of Fig. 1.

Fig. 4 is an explanatory view showing the assemblage of two successive arms.

Fig. 5 represents a clutch-disc with arms stamped and cambered.

Fig. 6 is a section on the line 6—6, Fig. 5.

Figs. 1 to 4 show the clutch disc for the driven part of a clutch.

The metallic part of the disc, usually of fairly large dimensions, essentially comprises a series of independent arms 1 stamped from sheet metal and juxtaposed in such a manner that the ends exactly form the circular part on which the lining is to be cast according to the invention. The outer ends of these arms 1 are cut out, punched, sawn, striated or undulated as indicated at "A, B, C, D, or E", and the friction material 2 is applied to said ends by casting and compression, followed by baking.

When the arms 1 of the metallic armature are sufficiently thin, of restricted length, or of greatly reduced surface areas, the friction ring 2 can be in one piece, as shown at the left side of Fig. 1, since owing to the independence of these metallic parts, deformation due to heat could have no effect.

When constructional exigencies necessitate the use of thicker sheet metal in the formation of the arms, the casting of the friction crown may, as indicated at the right side of Fig. 1, be formed in independent segments, so that the expansions should have no influence.

In Figs. 1 to 4 the clutch disc, which has eight driving arms, is shown as formed of five members comprising two crown portions, two arms and one hub portion formed by cutting out the crown part 3 adapted to receive the lining 2, the arms 4 and the hub part 5 adapted to drive the clutch shaft. The shape of each driving arm is shown in Fig. 4. Each hub part 5 has a central opening 15 at a right angle to the plane of the arms 1 and which is adapted to receive the central shaft of the clutch (not shown).

The hub parts 5 are pressed out at different heights, so as to be capable of being superposed on each other and even to receive interpolated washers 6 (Fig. 2), formed with the same grooves as the central part of the hub portions.

The members just mentioned being fitted into one another, a sufficient thickness of metal is produced at the center to form the driving hub of the clutch shaft.

Eight light rivets 7 extending through a counterplate 8 and the arms 4 adjacent the hub portions keep the members in place to facilitate handling, when casting the lining.

Figs. 5 and 6 represent a driven clutch disc lined in the same manner but wherein the arms 10, instead of being pressed out as indicated above, are simply bent or cambered (Fig. 6) so that the crown pieces 11 to be lined are in the same plane. The arms 10 are coupled together by riveting 12 and having therebetween a certain number of metallic washers 13, cut out at 14 according to the grooving of the shaft to be driven and made from the wastage in the manufacture of the main arms 10. In the embodiment of the invention shown in Fig. 5 the arms 10 may either only extend from the hub to the periphery, as shown in Fig. 6, or the outer ends of said arms may be formed with diametrical elements, such as shown at 3 in Fig. 4.

The invention has only been described and represented in a purely explanatory but in no way limitative manner, and it is obvious that various modifications in detail could be introduced without departing from the spirit thereof.

Besides, the invention equally applies, in certain of its aspects, to the case in which the friction lining is applied in any manner on a metallic core.

I claim:

1. A friction member comprising a plurality of superposed elements each having two crown-portions, two arms and a hub-portion, said hub-portions being raised different distances relative to the plane of the arms and crowns so as to bring all crown-portions into the same plane, and a friction lining fixed on said crown portions.

2. A friction member comprising a plurality of superposed elements each having two crown-portions, two arms and a hub-portion, said hub-portions being raised different distances relative to the plane of the arms and crowns so as to bring all crown-portions into the same plane, a friction lining fixed on said crown portions, and washers interposed between said elements.

3. A friction disc comprising a plurality of superposed elements each having two crown-portions, two arms and a hub-portion, said hub-portions being raised different distances relative to the plane of the arms and crowns so as to bring all portions of the crown into the same plane, a friction lining fixed on said crown portions, and washers interposed between said elements, said washers being slotted for the purpose of keying them on the shaft.

4. A friction member comprising a plurality of superposed elements, each having two crown portions, two arms and a hub-portion, the said hub portions being raised relatively to the plane of the arms and crown portions so as to bring all crown-portions into the same plane, and a ring of friction material in which the said crown-portions are embedded.

5. A friction member comprising a plurality of superposed elements, each having two crown portions, two arms and a central hub-portion, the said hub portions being raised relatively to the plane of the arms and crown portions so as to bring all crown-portions into the same plane, and a ring of friction material in which the said crown-portions are embedded and washers interposed between said elements.

6. A friction member comprising a plurality of superposed elements each having two crown-portions, two arms and a hub-portion, said hub portions being raised different distances relative to the plane of the arms and crowns so as to bring all crown-portions into the same plane, a ring of friction material in which the said crown-portions are embedded, and washers interposed between said elements, said washers and elements having means for securing them rotationally to a central shaft.

7. A friction disc comprising a plurality of superposed elements, each having two crown-portions, two arms and a hub-portion, said hub-portions being raised different distances relative to the plane of the arms and crowns so as to bring all crown-portions into the same plane, a friction lining fixed on said crown-portions, and means for assembling said elements together.

8. A friction member comprising a plurality of superposed radiating elements each having a hub portion, said hub portions being raised different distances relative to a plane common to the outer ends of all of said elements, and a friction lining secured to said outer ends.

9. A friction member comprising a plurality of superposed radiating elements each having a hub portion, said hub portions being raised different distances relative to a plane common to the outer ends of all of said elements, a friction lining secured to said outer ends, and spacing means between said elements.

10. A friction member comprising a plurality of superposed radiating elements each having a hub portion, said hub portions being raised different distances relative to a plane common to the outer ends of all of said elements, a friction lining secured on said outer ends, and means for securing said elements to a central shaft.

11. A friction member comprising a plurality of superposed radiating elements each having a hub portion, said hub portions being raised different distances relatively to a plane common to the outer ends of all of said elements, a friction lining secured to said outer ends, spacing means between said elements, and means for securing said elements to a central shaft.

12. A friction member comprising a plurality of superposed radiating elements each having a hub portion, said hub portions being raised different distances relatively to a plane common to the outer ends of all of said elements, and a ring of friction material in which said outer ends are embedded.

EDOUARD JEAN DESROZIERS.